United States Patent
Braun et al.

(10) Patent No.: US 10,244,484 B2
(45) Date of Patent: Mar. 26, 2019

(54) METHODS AND DEVICES FOR PATH-LOSS ESTIMATION

(71) Applicant: GOOGLE TECHNOLOGY HOLDINGS LLC, Mountain View, CA (US)

(72) Inventors: Mark R Braun, Elgin, IL (US); Scott P Debates, Crystal Lake, IL (US); Francis W Forest, Lake Villa, IL (US); James A Van Bosch, Crystal Lake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 15/353,239

(22) Filed: Nov. 16, 2016

(65) Prior Publication Data
US 2017/0064643 A1     Mar. 2, 2017

Related U.S. Application Data

(62) Division of application No. 14/094,956, filed on Dec. 3, 2013, now abandoned.

(51) Int. Cl.
*H04B 7/00* (2006.01)
*H04W 52/24* (2009.01)
(Continued)

(52) U.S. Cl.
CPC .......... *H04W 52/242* (2013.01); *H04B 17/27* (2015.01); *H04W 4/80* (2018.02);
(Continued)

(58) Field of Classification Search
CPC ... H04W 52/242; H04W 4/008; H04W 24/08; H04W 52/14; H04W 76/02; H03B 17/27
See application file for complete search history.

(56) References Cited

U.S. PATENT DOCUMENTS

| | | | |
|---|---|---|---|
| 7,010,332 B1 * | 3/2006 | Irvin | H04M 1/05 379/106.02 |
| 7,184,745 B2 | 2/2007 | Ballantyne et al. | |

(Continued)

FOREIGN PATENT DOCUMENTS

| | | |
|---|---|---|
| KR | 102013011697 | 10/2013 |
| WO | WO-2013095590 A1 | 6/2013 |

OTHER PUBLICATIONS

"Bluetooth Proximity Profile", Bluetooth SIG web site, Jun. 21, 2011, XP055118502, https://www.bluetooth.org/en-us/specification/adopted-specifications, retrieved May 16, 2014.
(Continued)

*Primary Examiner* — Stephen M D Agosta
(74) *Attorney, Agent, or Firm* — Colby Nipper

(57) ABSTRACT

A method on an electronic device for a wireless network is described. A wireless signal is received from a second electronic device. A receive power level indication for the received wireless signal is determined. A path-loss offset for the received wireless signal is determined based on sensor data that indicates a path-loss condition. A path-loss for the received wireless signal is estimated based on the receive power level indication and the path-loss offset. A function is performed based on the path-loss and the path-loss threshold.

20 Claims, 6 Drawing Sheets

(51) Int. Cl.
  *H04W 24/08* (2009.01)
  *H04B 17/27* (2015.01)
  *H04W 52/14* (2009.01)
  *H04W 4/80* (2018.01)
  *H04W 76/10* (2018.01)
  *H04W 88/06* (2009.01)
  *H04B 17/318* (2015.01)
  *H04W 64/00* (2009.01)

(52) U.S. Cl.
  CPC ........... *H04W 24/08* (2013.01); *H04W 52/14* (2013.01); *H04W 76/10* (2018.02); *H04B 17/318* (2015.01); *H04W 64/00* (2013.01); *H04W 88/06* (2013.01)

(56) References Cited

U.S. PATENT DOCUMENTS

| | | | |
|---|---|---|---|
| 7,397,357 | B2 | 7/2008 | Krumm et al. |
| 7,683,835 | B2 | 3/2010 | Sharma |
| 8,270,905 | B1 | 9/2012 | Cahill et al. |
| 8,326,451 | B2 | 12/2012 | Schantz et al. |
| 8,447,330 | B2 | 5/2013 | Chakravarty et al. |
| 8,467,770 | B1 | 6/2013 | Ben Ayed |
| 2001/0038619 | A1 | 11/2001 | Baker et al. |
| 2003/0003875 | A1* | 1/2003 | Oestreich ............ H04W 52/265 455/69 |
| 2004/0204026 | A1 | 10/2004 | Steer et al. |
| 2005/0009532 | A1* | 1/2005 | Cuffaro ................ H04W 24/10 455/452.2 |
| 2006/0232472 | A1 | 10/2006 | Roslak |
| 2008/0031144 | A1* | 2/2008 | Kawamoto ........... H04W 24/06 370/242 |
| 2008/0268830 | A1* | 10/2008 | Sharma .................. H04W 4/02 455/421 |
| 2010/0075661 | A1* | 3/2010 | Li ......................... H04W 28/18 455/423 |
| 2010/0118830 | A1 | 5/2010 | Stephenson et al. |
| 2010/0176967 | A1* | 7/2010 | Cumeralto ............. G01D 4/006 340/870.02 |
| 2010/0302102 | A1 | 12/2010 | Desai et al. |
| 2011/0038271 | A1 | 2/2011 | Shin et al. |
| 2012/0059622 | A1* | 3/2012 | Cacace ............... H05B 37/0272 702/150 |
| 2012/0309388 | A1 | 12/2012 | Moosavi et al. |
| 2013/0063301 | A1 | 3/2013 | Pattabiraman et al. |
| 2013/0144411 | A1 | 6/2013 | Savarese et al. |
| 2013/0165151 | A1 | 6/2013 | Gits et al. |

OTHER PUBLICATIONS

Invitation to Pay Additional Fees—Partial International Search Report issued in corresponding App. No. PCT/US2014/067387 dated Feb. 17, 2015.

* cited by examiner

600

METHODS AND DEVICES FOR PATH-LOSS ESTIMATION

CROSS-REFERENCE TO RELATED APPLICATIONS

This application is a division of U.S. application Ser. No. 14/094,956, filed Dec. 3, 2013, the content of which is incorporated by reference herein in its entirety.

TECHNICAL FIELD

The present disclosure is related generally to wireless device communication and, more particularly, to estimation of path-loss between wireless devices.

BACKGROUND

Electronic devices, such as smartphones and tablets are often used in combination with wearable electronic devices, such as wireless headsets or watches. For example, a user may have a smartphone and a smart watch that are communicatively linked or "paired" to each other via Bluetooth™ or other wireless communication technologies. A wireless communication link between the smartphone and watch allows for exchanging data between them, but also for estimating their proximity. The smartphone (or watch) may be configured to alert the user when the distance to the paired device reaches a predetermined threshold to prevent the user from leaving the paired device behind, prevent moving the device without the user's knowledge (e.g., being stolen), or to lock either device to prevent unauthorized access when out of range.

The smartphone may estimate a distance between itself and the watch based on a signal strength of a wireless signal received from the watch; however, various factors affect the received signal strength independently from the actual distance. Environmental factors, such as moving between rooms in a house or office building, can increase interference and reduce the received signal strength as the wireless signal must travel through walls and other materials. Moving from an indoor location to an outdoor location can also reduce received signal strength due to fewer multipath signal reflections. Variations in received signal strength caused by environmental factors can cause the smartphone to alert the user, based on the received signal strength, when the actual distance between the smartphone and the watch is within an acceptable range.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
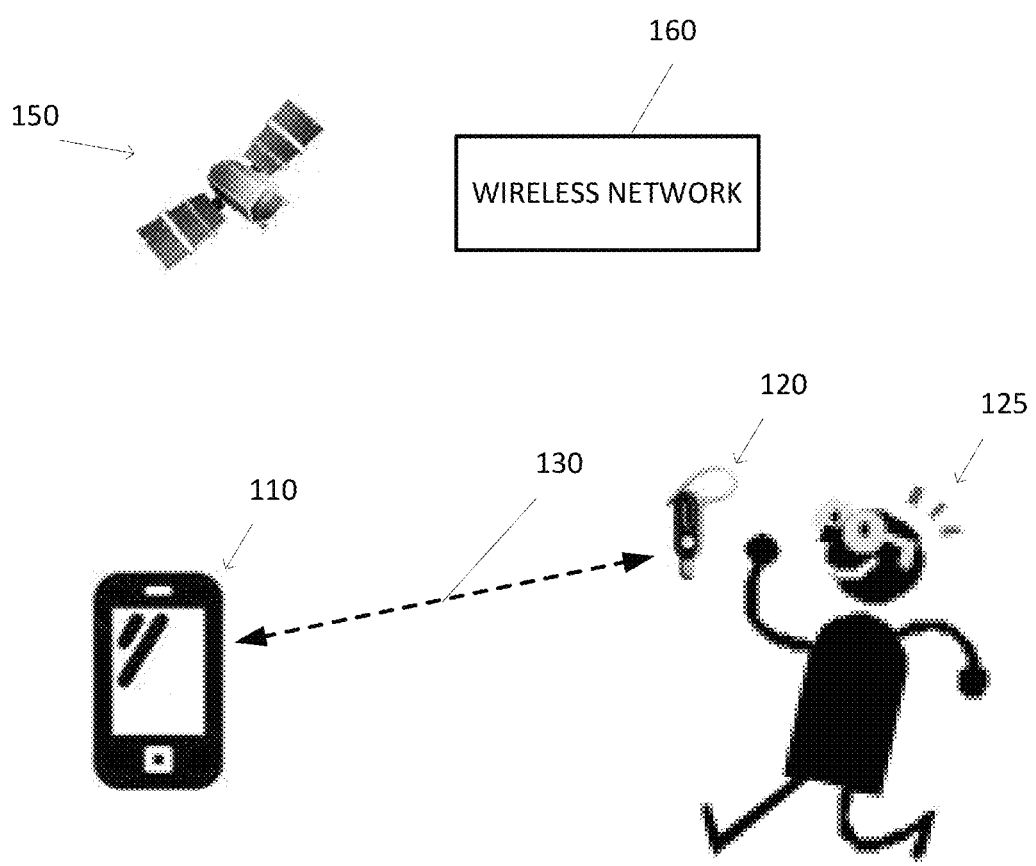
FIG. 1 is an overview of a representative communication system in which the methods of this disclosure may be practiced.

Turning to the drawings, wherein like reference numerals refer to like elements, the following description is based on embodiments of the claims and should not be taken as limiting the claims with regard to alternative embodiments that are not explicitly described herein.

The various embodiments described herein allow a smartphone or other electronic device to improve accuracy of proximity-triggered functions by using sensor data that indicates a path-loss condition. When a path-loss condition is determined, a path-loss offset is determined and used for estimation of the path-loss. The path-loss offset compensates for the path-loss condition to reduce false proximity alerts. As one example, a smartphone may be configured with a proximity-triggered function such as an alarm that activates when a smart watch is further than 1.0 meters away. When both the smartphone and watch are located indoors, the smartphone may use a received signal strength corresponding to the smart watch to determine its proximity as a first value, such as 0.75 meters when the phone is set nearby on a table. The received signal strength is affected by environmental conditions such as multi-path reception or interference due to obstructions. Moving the smartphone and watch outdoors may reduce the effect of multi-path reception, resulting in a lower received signal strength. For example, the lower received signal strength may correspond to a distance of 1.2 meters even when the actual distance between the smartphone and smart watch has remained the same (i.e., 0.75 meters). Accordingly, the smartphone is configured to determine a path-loss offset to compensate for the reduced multi-path reception (or other path-loss condition), thus reducing the occurrence of a false proximity alert. The smartphone determines the path-loss offset based on sensor data that indicates whether the smartphone or smart watch is indoors or outdoors, stowed in a pocket or bag, or placement in the user's hand. Other path-loss conditions and corresponding sensor data will be apparent to those skilled in the art.

In one embodiment, an electronic device determines a path-loss offset based on sensor data that indicates a path-loss condition. The electronic device estimates a path-loss based on the path-loss offset and a received signal strength from another electronic device. The electronic device then performs a function based on the estimated path-loss.

Turning to FIG. 1, a pair of electronic devices 110 and 120 is shown. Possible implementations of the electronic devices 110 and 120 include a smartphone, tablet, wireless wristwatch (e.g., a "smart watch"), wireless headset, laptop or personal computer, key fob, wireless-enabled glasses, smart pen, or other wireless communication enabled device. As shown in the example of FIG. 1, the electronic device 110 is a smartphone and the electronic device 120 is a wireless headset of a user 125. One or more of the electronic devices 110 or 120 may be configured to receive communications from a satellite-based positioning system 150 or a wireless network 160. Examples of the satellite-based positioning system 150 include the global positioning system ("GPS"), Globalnaya Navigatsionnaya Sputnikovaya Sistema ("GLONASS"), BeiDou Navigation Satellite System, Galileo navigation system, and Indian Regional Navigational Satellite System. Possible implementations of the wireless network 160 include a cellular network, Institute of Electrical and Electronics Engineers ("IEEE") 802.11 network, or other wireless communication network.

Figure 2:
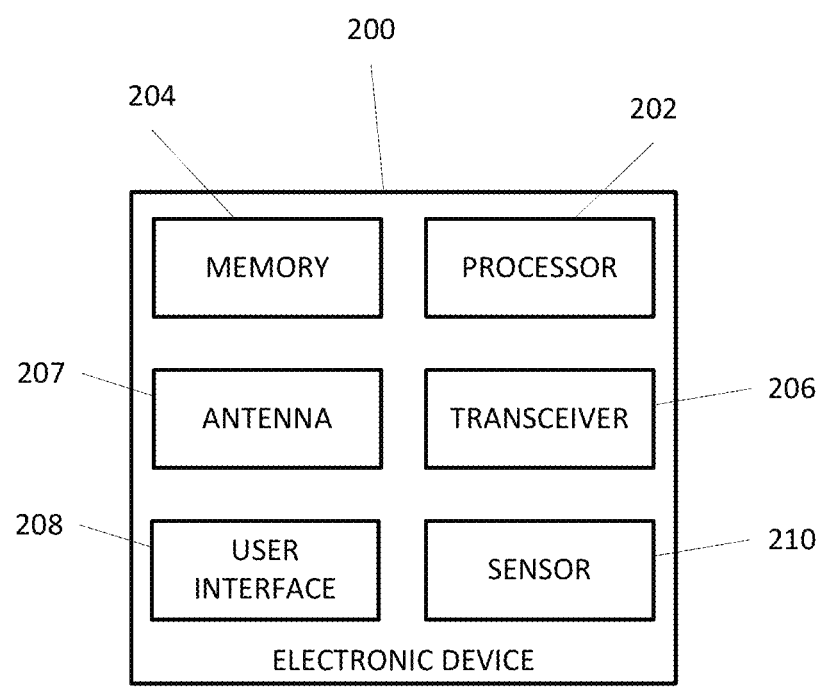
FIG. 2 is a simplified block diagram of a representative electronic device.

Turning to FIG. 2, a simplified block diagram illustrates an embodiment of an electronic device 200. The electronic device 200 in one example implements one or more of the electronic devices 110 or 120. As shown in FIG. 2, the electronic device 200 includes a processor 202 that executes stored programs. The electronic device 200 further includes a memory 204. The processor 202 writes data to and reads data from the memory 204. The electronic device 200 also includes a radio transceiver 206 and antenna 207 configured for sending and receiving data, for example, over a wireless network (e.g., the wireless network 160 of FIG. 1) or with other electronic devices (e.g., via a wireless communication link). In a further example, the radio transceiver 206 and antenna 207 are configured for receiving communications from a satellite-based positioning system (e.g., the satellite-based positioning system 150 of FIG. 1). In some embodiments, the electronic device 200 has a user input interface 208 that may include one or more of a keypad, display screen, touch screen, or the like. In some embodiments, the electronic device 200 includes one or more sensors 210. Possible implementations of the sensors 210 include a gyroscope, accelerometer, magnetometer, ambient light sensor, temperature sensor, microphone, barometer, or proximity sensor. In alternative implementations, various components of the electronic device 200 may be combined or divided. For example, the radio transceiver 206 or antenna 207 may be separated into a plurality of components for separately handling GPS, Bluetooth™, 802.11, and cellular communications. Alternatively, the radio transceiver 206 may be configured as a combined radio transceiver for multiple wireless communication protocols or links.

Referring again to FIG. 1, the electronic devices 110 and 120 are configured to establish a wireless communication link 130 between each other. Possible implementations of the wireless communication link 130 include a Bluetooth™ link, IEEE 802.11 link, IEEE 802.15 link, or other radio frequency ("RF") communication link. For a Bluetooth™ link, the electronic devices 110 and 120 may implement the Proximity Profile as defined in Bluetooth™ Specification PXP SPEC (available from https://www.bluetooth.org/en-us/specification/adopted-specifications). In this case, the electronic device 110 implements the proximity monitor role while the electronic device 120 implements the proximity reporter role. In other examples, the roles are reversed between the electronic devices 110 and 120 or additional roles may be implemented.

To aid in the clarity of the description, each device will be referred to by the role that it plays with respect to a Bluetooth™ implementation while carrying out the methods set forth in this disclosure. More specifically, the first device will be referred to as the monitoring device 110 (e.g., a smartphone) while the second device will be referred to as the reporting device 120 (e.g., a headset). In practice, however, either device could act as a monitoring device or as a reporting device. In other words, the generic term "first device" can refer to either a monitoring device or a reporting device. Likewise, the generic term "second device" can refer to either a monitoring device or a reporting device. Additionally, the methods may be practiced with other RF communication technologies.

The monitoring device 110 is configured to estimate path-loss on the wireless communication link 130 with the reporting device 120 based on a received signal strength associated with the reporting device 120 and a path-loss offset. For example, the monitoring device 110 calculates a first path-loss by subtracting a received signal strength (e.g., RSSI) from a transmit signal strength (e.g., a TX power level indication). The monitoring device 110 determines a transmit power level indication for the reporting device 120 based on a TX power message received from the reporting device 120. Based on the calculated first path-loss, the monitoring device 110 estimates a second path-loss (i.e., an estimated second path-loss) by adding the path-loss offset to the calculated first path-loss. The monitoring device 110 is configured to determine the path-loss offset based on sensor data from the sensors 210. The monitoring device 110 then estimates the second path-loss on the wireless communication link 130 using the received signal strength and path-loss offset.

For determination of the path-loss offset, the monitoring device 110 in one example determines a device context indicator based on an output from one or more sensors (e.g., sensors 210 of FIG. 2), data received from a remote device (e.g., via radio transceiver 206 of FIG. 2), or data stored in the monitoring device 110. The device context indicator may be a raw signal output from a sensor or a processed output from a single sensor or multiple sensors. Examples of the device context indicator include a current location of the monitoring device 110, a movement speed or movement type associated with the monitoring device 110, a movement velocity, an orientation or surface positioning of the monitoring device 110, a state indicator for the monitoring device 110 (e.g., a user interface setting or lock status), a connection status with another device (e.g., Bluetooth™, Wi-Fi, Zigbee), sensor data of the monitoring device 110, a device heading, microphone input, ambient light sensor data, capacitive sensor data, detection status or path-loss for another device (not shown) or a stationary wireless network 160, or a received signal strength of a stationary wireless network 160. In another example, the device context indicator is a status indicator that indicates an activity or movement type in which the user 125 is engaged, such as driving, walking, running, or bicycling. The state indicator for the monitoring device 110 in one example indicates whether the monitoring device 110 or reporting device 120 is stowed (e.g., in a pocket or bag).

In a further example, the monitoring device 110 receives sensor data or one or more device context indicators from the reporting device 120 (e.g., via the wireless communication link 130). The device context indicators from the reporting device 120 may be the same or different (e.g., movement speed of the reporting device 120, orientation of the reporting device 120, received signal strength, etc.). Accordingly, the monitoring device 110 may use device context indicators or sensor data from both the monitoring device 110 and the reporting device 120 to determine the path-loss offset. In yet another example, the monitoring device 110 obtains a device context indicator from another remote electronic device (e.g., via the wireless network 160 or another wireless communication link). Accordingly, the device context indicator may be associated with the monitoring device 110, the reporting device 120, or another device (not shown).

One example of a device context indicator is a movement type, such as whether the device is stationary or moving. In some implementations, the movement type is more specific, such as motionless, micromotion, walking, running, driving or movement in a vehicle, arm swinging, arm steering a car, pen writing, or others. In one example, the monitoring device 110 determines that the user 125 is driving based on a movement speed and a location obtained based on signals from the satellite-based positioning system 150 (e.g., moving above 40 miles per hour and located on an expressway). In this case, the monitoring device 110 selects a path-loss offset that corresponds to path-loss within a vehicle. The monitoring device 110 in one example determines a path-loss offset that compensates for signal fade due to movement speed or type.

In yet another example, the monitoring device 110 may determine the location, movement speed, movement velocity, or movement type based on detection of or proximity to a stationary Wi-Fi network (e.g., based on received signal strength or a change in received signal strength) such as the wireless network 160 (e.g., a fixed Wi-Fi network located at the user's home or place of work).

Figure 3:
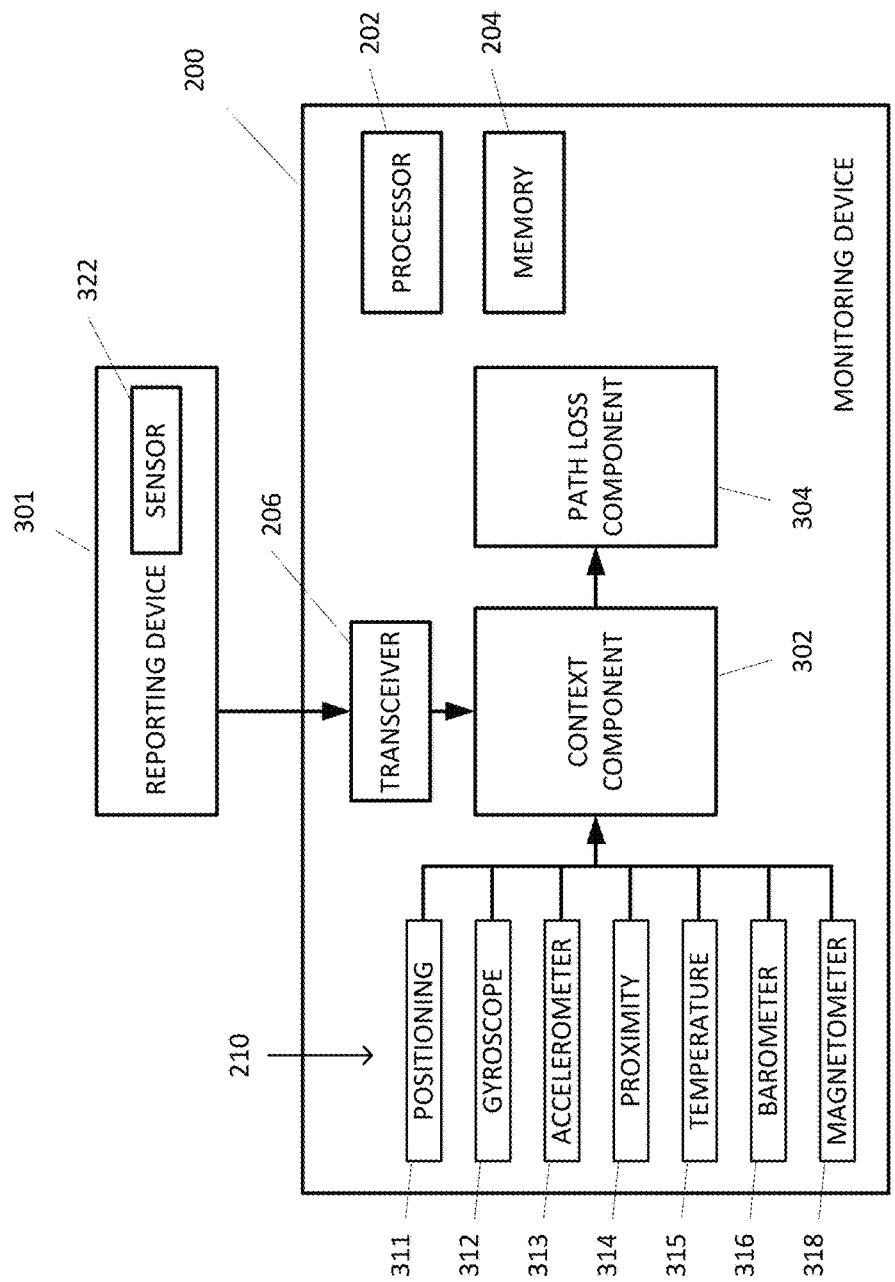
FIG. 3 is a simplified block diagram of another implementation of the electronic device with a remote device.

Turning to FIG. 3, another implementation of the monitoring device 200 of FIG. 2 is shown with a reporting device 301. The monitoring device 200 in this implementation further includes a context component 302 for determination of the device context indicators. The monitoring device 200 further includes a path-loss component 304 for determination of the path-loss offset based on the sensor data or device context indicators and estimation of the path-loss. The monitoring device 200 includes a plurality of sensors 210, such as a positioning sensor 311 (e.g., for GPS positioning or RF triangulation), gyroscope 312, accelerometer 313, proximity sensor 314, temperature sensor 315, barometric sensor 316, and magnetometer 318. The monitoring device 200 may have additional or fewer sensors 210 in alternative embodiments. The reporting device 301 includes a sensor 322. The context component 302 is configured to receive sensor data from the sensors 210 and also from the sensor 322 (via the radio transceiver 206).

Figure 4:
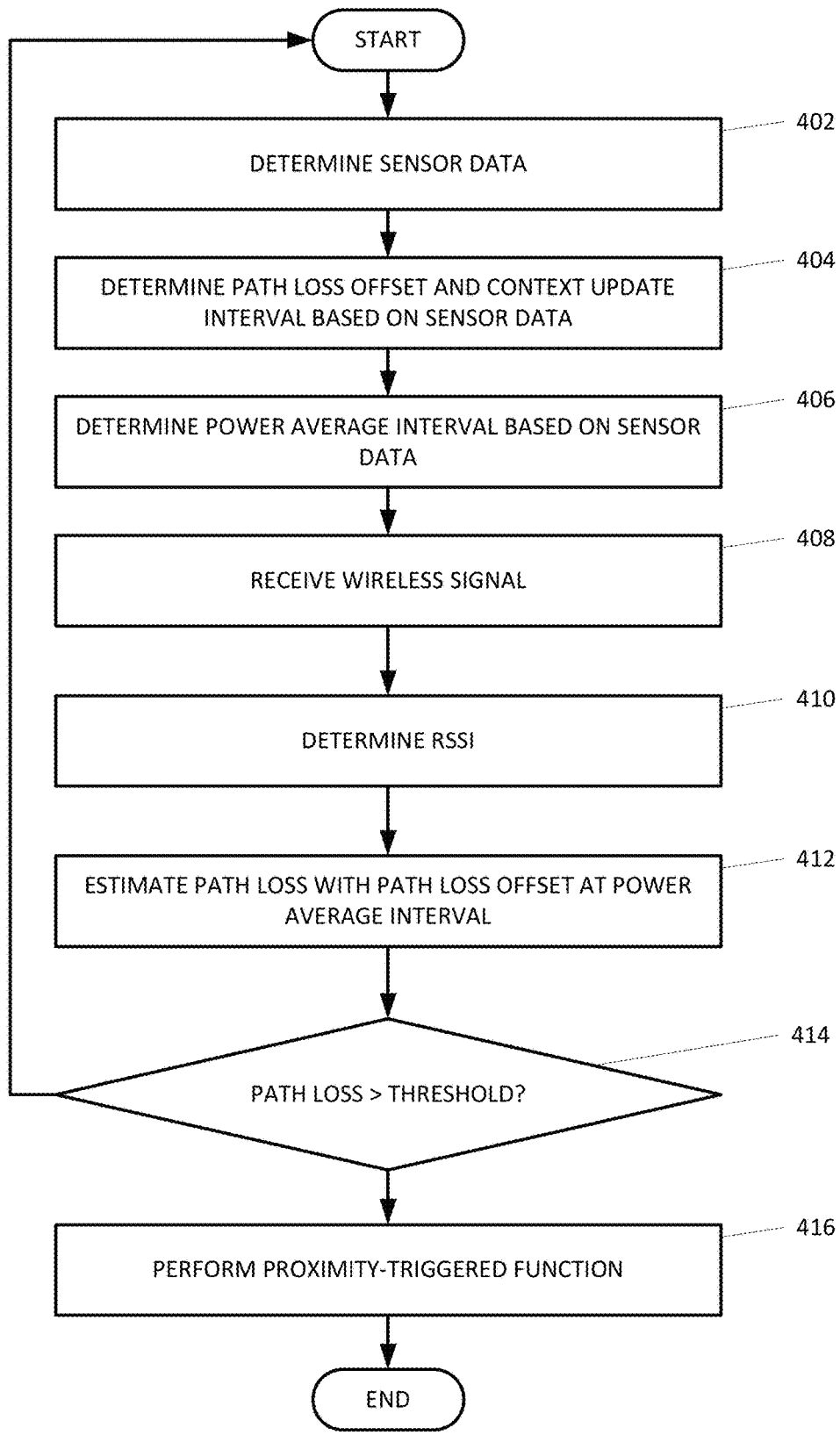
FIG. 4 is a process flow of a method for estimation of a path-loss between the electronic device and the remote device of FIG. 3.

Turning to FIG. 4, a process flow 400 illustrates one example of a method performed by the monitoring device 110, according to an embodiment. The monitoring device 110 starts the process flow 400 upon a predetermined schedule or interval, such as a context update interval (e.g., every 200 milliseconds, every second, every three seconds, or other intervals). In another implementation, the monitoring device 110 starts the process flow 400 in response to a signal or message. The signal or message in one example indicates a change in an RF measurement or sensor data. For example, a sudden drop in a Wi-Fi signal may indicate that the user 125 has left a predetermined location (e.g., the user's home) or another fixed location. Alternatively, a sudden drop in a GPS signal may indicate that the user has gone indoors.

The monitoring device 110 determines (402) sensor data at the context update interval. As described above, the sensor data (or portions thereof) may be received from the sensors 210 of the monitoring device 110 or received from the reporting device 120. Where the sensor data is from the reporting device 120, the monitoring device 110 may poll the reporting device 120 at the context update interval or alternatively, set an advertising interval of the reporting device 120 to be the context update interval. When using the advertising interval, the monitoring device 110 may send an indication of which sensor data of the reporting device 120 should be sent by the reporting device 120. Optionally, the monitoring device 110 analyzes the sensor data to determine a device context indicator for the monitoring device 110 or the reporting device 120 as described herein with reference to FIG. 5.

The monitoring device determines (404) the path-loss offset and the context update interval based on the sensor data or device context indicators. The monitoring device 110 in one example uses a lookup table or database with sensor data values or device context indicators that correspond to path-loss offsets. The lookup table or database may be created based on empirical measurements of path-loss under various conditions or interpolation of measurements, as will be apparent to those skilled in the art. In another example, the monitoring device 110 dynamically determines the path-loss offset using an algorithm or procedure that is performed on the sensor data.

In alternative implementations, the monitoring device 110 may determine whether the path-loss offset or context update interval should be changed based on the sensor data or device context indicators. For example, where several device context indicators have changed or are inconsistent with each other, one or more of the changes or device context indicators may cancel another out. In this case, the monitoring device 110 combines corresponding path-loss offsets for the device context indicators (e.g., condition offsets) or proceeds without updating the path-loss offset. As one example, outputs from the magnetometer 318 and the gyroscope 312 may be compared for consistency (e.g., based on angular momentum in the case of a mechanical gyroscope) to reduce an effect of inaccuracies in the magnetometer 318 due to a magnetic anomaly. In this case, a path-loss offset based on the magnetometer 318 may be ignored as inconsistent with the gyroscope 312. The context update interval may also be combined or averaged based on the sensor data. The monitoring device 110 in one example adjusts the context update interval to reduce battery drain on the monitoring device 110 or reporting device 120.

The monitoring device 110 in one example determines (406) a receive power average interval based on the sensor data or device context indicators. The receive power average interval is used for determination of the received signal strength, as described herein. The monitoring device 110 receives (408) at least one wireless signal over the wireless communication link 130 from the reporting device 120. The received wireless signal may be a wireless signal requested by the monitoring device 110 for purposes of determining the path-loss or a wireless signal sent for another purpose, such as a data transfer.

The monitoring device 110 determines (410) a received signal strength based on the received wireless signal (or multiple wireless signals). The received signal strength in one example is a received signal strength indicator ("RSSI") or received channel power indicator ("RCPI"). The monitoring device 110 estimates (412) the path-loss based on the path-loss offset. The estimation is performed on the occurrence of the receive power average interval. For example, the monitoring device 110 estimates the path-loss repeatedly at the receive power average interval, e.g., every 200 milliseconds, every second, every three seconds, or other intervals. The monitoring device 110 in one example dynamically determines the receive power average interval based on the sensor data. The monitoring device 110 selects a relatively longer receive power average interval (e.g., four seconds) when the sensor data indicates that the monitoring device 110 or reporting device 120 is stationary than when in motion (e.g., one second).

When estimating (412) the path-loss, the monitoring device 110 in one example performs one or more procedures on a plurality of received signal strength indicators received over the receive power average interval, or a subset thereof, to determine the received signal strength. The monitoring device 100 may select the one or more procedures to be applied to the received RSSI values based on sensor data, device context indicators (e.g., whether the monitoring device 110 is in motion or stationary), or a combination thereof. Examples of procedures include an averaging filter, a feedback filter, a finite impulse response ("FIR") filter, or Viterbi algorithm. An averaging filter calculates the average RSSI value from incoming received packets from the reporting device 120. A feedback filter uses a portion of a most recent RSSI value for each calculation and thus allows for smoothing of large difference in RSSI values. The monitoring device 110 in one example selects the feedback filter when stationary to reduce false triggering. In another example, the monitoring device 110 selects the Viterbi algorithm when the received RSSI values are rapidly changing (e.g., due to movement of the monitoring device 110).

The monitoring device 110 in one example estimates (412) the path-loss as the path-loss offset added to a calculated path-loss. The monitoring device 110 calculates a first path-loss as the transmit power (e.g., a TX value) of the reporting device 120 minus the received signal strength (e.g., RSSI). An indication of the transmit power is received from the reporting device 120 (e.g., through a TX power message). In other implementations, the transmit power may be a predetermined value, such as 0 dBm or +10 dBm. Where the transmit power is zero, a magnitude of the calculated first path-loss is equal to the RSSI. For example, a transmit power of 0 dBm and a received signal strength of −60 dBm results in a calculated path-loss of 60 dBm. Based on the calculated first path-loss, the monitoring device 110 estimates a second path-loss (i.e., an estimated second path-loss) by adding the path-loss offset to the calculated first path-loss. After estimation (412) of the path-loss, the monitoring device 110 may optionally estimate the distance to the reporting device 120, for example, using a distance formula based on the estimated path-loss or a lookup table. While received signal strength is described herein as units of dBm, in alternative embodiments another measurement, metric, or indicator may be used. For example, the received signal strength may be indicated in dBW or a unitless value, such as a range of 0 to 100, 0 to 127, or others, as may be appreciated by those skilled in the art.

While the steps of determining (402, 404, 406, 410), receipt (408), and estimating (412) are shown as adjacent steps, the steps may be performed as part of one or more separate process flows. In this case, the monitoring device 110 may update the sensor data multiple times before using the sensor data to determine the device context indicators or estimate the path-loss. The context update interval and the receive power average interval may be the same or different. Thus, the monitoring device 110 may obtain the sensor data every ten seconds while estimating the path-loss every second.

Upon estimation (412) of the path-loss, the monitoring device 110 in one example determines (414) whether the path-loss meets an alert threshold. The alert threshold in one example is a path-loss threshold value that indicates that a proximity-triggered function should be performed. The monitoring device 110 uses a path-loss threshold value that corresponds to a distance between the monitoring device 110 and the reporting device 120. When using the path-loss threshold value, the monitoring device 110 selects the path-loss threshold value based on the sensor data or the proximity-triggered function to be performed. Alternatively, the path-loss threshold value may be predetermined. In other implementations, the monitoring device 110 uses the estimated distance based on the estimated path-loss to determine whether the alert threshold has been met. In this case, the alert threshold is a distance threshold, such as 1 meter, 4 meters, or other distance.

Examples of the proximity-triggered function include locking one or both of the monitoring device 110 and reporting device 120, initiating an alert (e.g., an audible or visible notification) on one or both devices, or sending a message to the reporting device 120 or to another device (not shown). The monitoring device 110 triggers or executes a proximity-triggered function when the path-loss has met (e.g., become equal to or greater than) the path-loss threshold value. For example, a user of the monitoring device 110 may wish to be notified when the reporting device 120, worn by the user's child, has moved (or been moved) 5 meters away or farther from the monitoring device 110. In alternative implementations, the monitoring device 110 may trigger the proximity-triggered function when the path-loss has become less than the path-loss threshold value.

The monitoring device 110 may use multiple alert thresholds (path-loss threshold values, distance threshold values, or combination thereof) corresponding to one or more proximity-triggered functions. If the alert threshold is not met (NO at 414), the process flow 300 ends (e.g., until the next context update interval). If the alert threshold is met (YES at 414), the monitoring device 110 performs (416) the proximity-triggered function and the process flow 400 ends.

Figure 5:
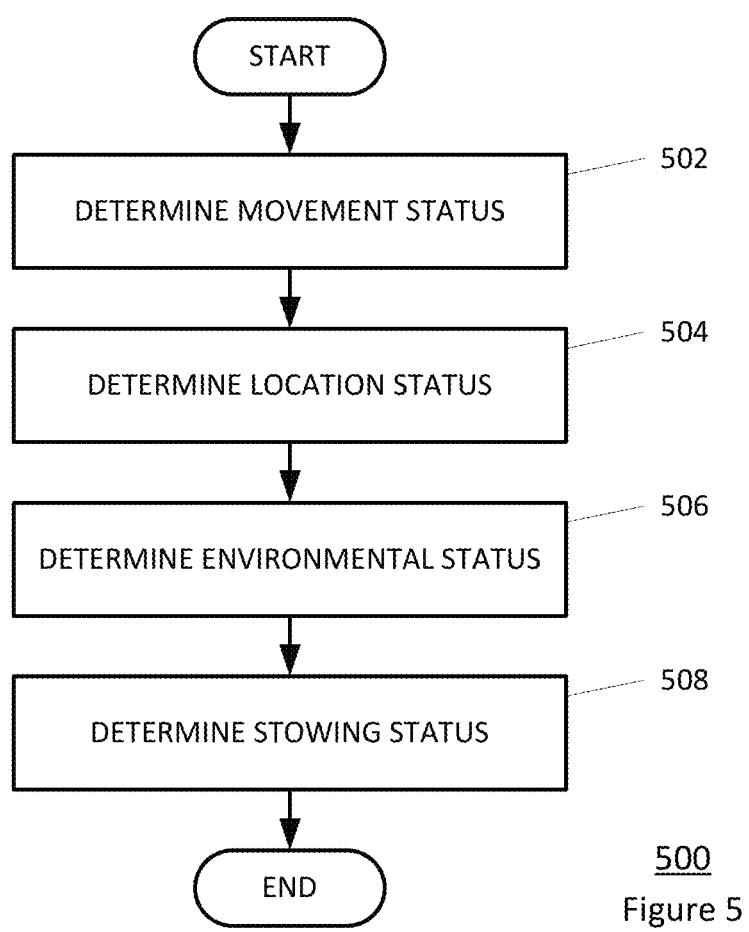
FIG. 5 is a process flow of a method for determining a device context indicator that may be performed by the electronic device of FIG. 3.

Turning to FIG. 5, a process flow 500 illustrates one example of a method performed by the monitoring device 110 for determination of one or more device context indicators. In other implementations, the process flow 500 may be performed by the reporting device 120. As described above, the process flow 500 may be performed at the context update interval or upon a change in sensor data. The monitoring device 110 determines (502) a movement status of the monitoring device 110, the reporting device 120, or both devices. As one example, the monitoring device 110 determines the movement status based on sensor data from the positioning sensor 311, gyroscope 312, accelerometer 313, or magnetometer 318. For example, if the monitoring device 110 detects periodic motion from the accelerometer 313 that is consistent with walking, the monitoring device 110 may determine that the device context indicator for the movement type is "walking." As described above, the monitoring device 110 determines a path-loss offset that compensates for signal fade due to movement speed or type. For example, if the reporting device 120 is a smart watch on the user's wrist while the user is jogging, the reporting device 120 may quickly move back and forth relative to the monitoring device 110. The monitoring device 110 determines a path-loss offset that corresponds to the movement of the reporting device 120.

The monitoring device 110 determines (504) a location status of the monitoring device 110, the reporting device 120, or both devices. The monitoring device 110 may determine that the user is located in their home, at work, in a shopping mall, or at a park based on the location from the satellite-based positioning system 150. In this case, the monitoring device 110 selects a path-loss offset that corresponds to path-loss in the respective location. The path-loss offset for the user's home (i.e., indoors) may be lower than that in an open park (i.e., outdoors) due to multi-path reception. In another example, the path-loss offset in a forest preserve or heavily wooded area may be higher than the open park due to signal interference from trees.

The monitoring device 110 determines (506) an environmental status of the monitoring device 110, the reporting device 120, or both devices. Examples of the environmental status include sensor data from the temperature sensor 315 and barometer 316. The monitoring device 110 in one example uses temperature and atmospheric pressure data to determine whether the monitoring device 110 is indoors or outdoors.

The monitoring device 110 determines (508) a stowing status of the monitoring device 110, the reporting device 120, or both devices. The monitoring device 110 in one example uses the proximity sensor 314 or an ambient light sensor (not shown) to determine whether the monitoring device is inside a bag or other container. In this case, the monitoring device 110 may select a path-loss offset to compensate for being inside of an enclosure as opposed to having line of sight to the reporting device 120. The monitoring device 110 may also use the proximity sensor 314 to determine whether the device is currently being gripped or held against the user's face (e.g., during a phone call). The monitoring device 110 selects a larger path-loss offset if either device is stowed or being held in order to compensate for interference due to the container or user's body.

Figure 6:
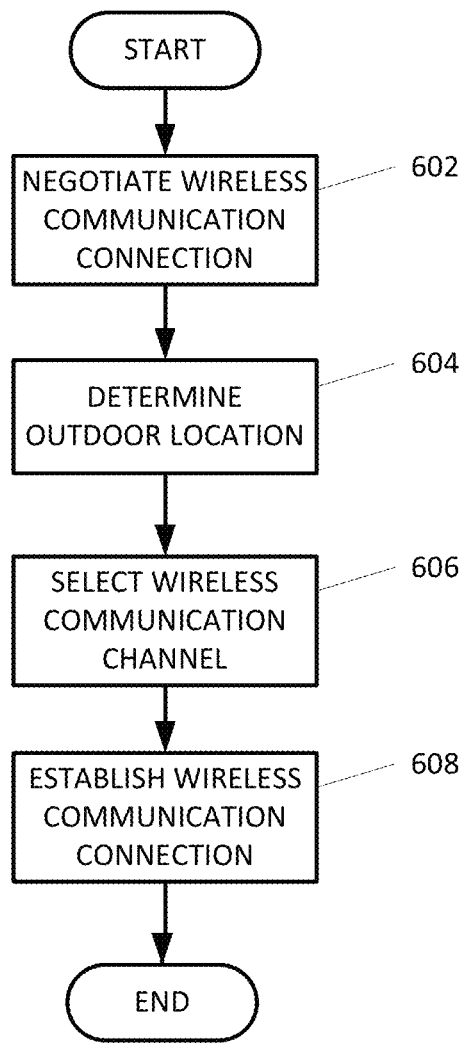
FIG. 6 is a process flow of a method for establishing a wireless communication connection between the electronic device and the remote device of FIG. 3.

Turning to FIG. 6, a process flow 600 illustrates one example of a method performed by the monitoring device 110 is shown for establishing a wireless communication connection, such as the wireless communication link 130. The monitoring device 110 negotiates (602) with the reporting device 120 as part of a pairing process. For example, the monitoring device 110 and reporting device 120 share their connection capabilities (e.g., frequencies, protocols, or features). The monitoring device 110 determines (604) whether it is located in an indoor or outdoor location. As described above, the monitoring device 110 uses the sensor data or device context indicators to determine the location. The monitoring device 110 selects (606) a wireless communication channel for the wireless communication connection based on the location determination. For example, some wireless communication channels within a set of channels may be restricted to indoor use only or may have less interference when outdoors. Upon selection of the wireless communication channel, the monitoring device 110 establishes (608) the wireless communication connection with the reporting device 120 using the selected channel. The monitoring device 110 may then estimate path-loss using the selected channel, as described above with reference to FIG. 4.

It can be seen from the foregoing that a method and system for improved accuracy of path-loss estimation is provided. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

The apparatus described herein may include a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

The disclosed embodiments may be described in terms of functional block components and various processing steps. Such functional blocks may be realized by any number of hardware and/or software components configured to perform the specified functions. For example, the disclosed embodiments may employ various integrated circuit components, e.g., memory elements, processing elements, logic elements, look-up tables, and the like, which may carry out a variety of functions under the control of one or more microprocessors or other control devices. Similarly, where the elements of the disclosed embodiments are implemented using software programming or software elements, the disclosed embodiments may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosed embodiments may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", "device", "controller", and "construction" are used broadly and are not limited to mechanical or physical embodiments, but may include software routines in conjunction with processors, etc.

No item or component is essential to the practice of the disclosed embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the disclosed embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the disclosed embodiments and does not pose a limitation on the scope of the disclosed embodiments unless otherwise claimed. Numerous modifications and adaptations will be readily apparent to those of ordinary skill in this art.

We claim:

1. A method performed by a first electronic device, the method comprising:
   receiving first sensor data from at least one of the first electronic device or a second electronic device that indicates a first path-loss condition that affects receive power level indications;
   selecting a context update interval based on the first sensor data;
   responsive to an elapsed time after the selection meeting the context update interval, receiving second sensor data from at least one of the first or second electronic device that indicates a second path-loss condition that affects receive power level indications;
   receiving a wireless signal from the second electronic device;
   determining a receive power level indication for the received wireless signal;
   calculating an initial path-loss based on the receive power level indication;
   determining a path-loss offset for the initial path-loss based on the second sensor data;
   calculating a second path-loss for the received wireless signal by adding the path-loss offset to the initial path-loss; and
   responsive to the second path-loss meeting a path-loss threshold value, performing a function.

2. The method of claim 1
   wherein the initial path-loss is based on a difference between a transmit power level indication received from the second electronic device and the receive power level indication.

3. The method of claim 1 further comprising receiving at least a portion of the second sensor data from the second electronic device.

4. The method of claim 3 further comprising
   polling the second electronic device for the portion of the second sensor data.

5. The method of claim 3 further comprising
   sending the context update interval to the second electronic device as an advertising interval such that the portion of the second sensor data is received from the second electronic device without the first electronic device requesting the portion of the second sensor data.

6. The method of claim 1 wherein the first or second sensor data indicates a movement type for the first or second electronic device.

7. The method of claim 1 wherein the first or second sensor data indicates a device context indicator for the first or second electronic device.

8. The method of claim 1 wherein the first or second sensor data indicates a stowing status, proximity to a face, handheld status, surface positioning, device heading, microphone input, ambient light sensor data, barometric pressure, ambient temperature, global positioning system data, Wi-Fi connection data, Bluetooth™ connection data, Zigbee connection data, accelerometer data, gyroscope data, capacitive sensor data, or location corresponding to the first or second electronic device.

9. The method of claim 1 wherein the second sensor data indicates a plurality of path-loss conditions; and
   wherein determining the path-loss offset comprises:
      selecting a condition offset for each of the plurality of path-loss conditions; and
      combining the condition offsets for the plurality of path-loss conditions to obtain the path-loss offset.

10. The method of claim 1 wherein the determining the receive power level
    is based on a plurality of receive power level indications over a receive power average interval.

11. The method of claim 10 wherein the receive power average interval is dynamically adjusted based on the second sensor data.

12. The method of claim 1 wherein the function comprises an alert function, a security function, or a proximity related function.

13. The method of claim 1 wherein the first electronic device comprises a tablet computer or cellular telephone.

14. The method of claim 1 wherein the second electronic device comprises a smart watch, key fob, smart pen, pair of smart glasses, tablet computer, audio headset, or a wearable electronic device.

15. The method of claim 1 wherein the path-loss offset comprises a numerical value in decibel-milliwatt (dBm), decibel-watt (dBW), or a unitless value.

16. A system comprising:
    one or more radio transceivers;
    one or more processors; and
    one or more non-transitory memory devices containing instructions that when executed by the one or more processors cause the system to perform operations comprising:
    receive first sensor data from at least one of the system or a remote electronic device that indicates a first path-loss condition that affects receive power level indications;
    selecting a context update interval based on the first sensor data;
    responsive to an elapsed time after the selection meeting the context update interval, receiving second sensor data from at least one of the system or the remote electronic device that indicates a second path-loss condition that affects receive power level indication;
    receiving, via the one or more radio transceivers, a wireless signal from the remote electronic device;
    determining a receive power level indication for the received wireless signal;
    calculating an initial path-loss based on the receive power level indication;
    determining a path-loss offset for the initial path-loss based on the second sensor data;
    calculating a second path-loss for the received wireless signal by adding the path-loss offset to the initial path-loss; and
    responsive to the second path-loss meeting a path-loss threshold value, performing a function.

17. The system of claim 16 wherein the remote electronic device is a smart watch, key fob, smart pen, pair of smart glasses, tablet computer, audio headset, or a wearable electronic device.

18. The system of claim 16 wherein the system comprises a tablet computer or cellular telephone.

19. The system of claim 16 wherein the first or second sensor data indicates a stowing status, proximity to a face, handheld status, surface positioning, device heading, microphone input, ambient light sensor data, barometric pressure, ambient temperature, global positioning system data, Wi-Fi connection data, Bluetooth™ connection data, Zigbee connection data, accelerometer data, gyroscope data, capacitive sensor data, or location corresponding to the system or the remote electronic device.

20. The system of claim 16 wherein the path-loss offset comprises a numerical value in decibel-milliwatt (dBm), decibel-watt (dBW), or a unitless value.

* * * * *